United States Patent
Nagai et al.

(10) Patent No.: US 9,291,074 B2
(45) Date of Patent: Mar. 22, 2016

(54) ENGINE WASTE-HEAT UTILIZATION DEVICE

(75) Inventors: Hiroyuki Nagai, Machida (JP); Takayuki Ishikawa, Yokohama (JP); Shinichiro Mizoguchi, Atsugi (JP); Riyako Iwahashi, Atsugi (JP); Shinji Nakamura, Maebashi (JP)

(73) Assignees: NISSAN MOTOR CO., LTD., Yokohama-shi, Kanagawa (JP); SANDEN CORPORATION, Isesaki-shi, Gunma (JP)

( * ) Notice: Subject to any disclaimer, the term of this patent is extended or adjusted under 35 U.S.C. 154(b) by 244 days.

(21) Appl. No.: 14/237,961

(22) PCT Filed: Aug. 6, 2012

(86) PCT No.: PCT/JP2012/070011
§ 371 (c)(1),
(2), (4) Date: Feb. 10, 2014

(87) PCT Pub. No.: WO2013/046932
PCT Pub. Date: Apr. 4, 2013

(65) Prior Publication Data
US 2014/0165567 A1    Jun. 19, 2014

(30) Foreign Application Priority Data
Sep. 30, 2011 (JP) ................................. 2011-216738

(51) Int. Cl.
*F01K 23/10* (2006.01)
*F01K 25/00* (2006.01)
(Continued)

(52) U.S. Cl.
CPC .............. *F01K 23/18* (2013.01); *F01K 23/065* (2013.01); *F01K 23/10* (2013.01); *F01K 23/14* (2013.01);
(Continued)

(58) Field of Classification Search
CPC ....... F01K 23/18; F01K 23/065; F01K 23/14; F01K 23/10; F02C 6/18; F01N 5/02; F01N 2340/04; F02G 5/04; Y02T 10/166; Y02T 10/16
USPC .............. 60/614, 616, 618, 651, 671; 62/239, 62/323.1
See application file for complete search history.

(56) References Cited

U.S. PATENT DOCUMENTS 7,152,422 B2 * 12/2006 Takano .............. B60H 1/00878
                                                62/238.6
8,415,815 B2 *  4/2013 Wada .................... F01C 11/006
                                                  290/2
(Continued)

FOREIGN PATENT DOCUMENTS

| EP | 2 143 880 A1 | 1/2010 |
| JP | S63-99464 A | 4/1988 |
| JP | 2001-182504 | 7/2001 |
| JP | 2005-030386 A | 2/2005 |
| JP | 2008-274834 A | 11/2008 |

(Continued)

*Primary Examiner* — Hoang Nguyen
(74) *Attorney, Agent, or Firm* — Drinker Biddle & Reath LLP

(57) ABSTRACT

An engine-waste-heat utilization device includes a Rankine cycle with a heat exchanger that is configured to recover engine-waste-heat to refrigerant, an expander that is configured to generate power using the refrigerant coming out from the heat exchanger, a condenser that is configured to condense the refrigerant coming out from the expander and a refrigerant pump that is configured to supply the refrigerant coming out from the condenser to the heat exchanger by being driven by the expander, a power transmission mechanism (crank pulley, pump pulley, belt) that is configured to transmit surplus power to the engine when the expander has spare power even if the refrigerant pump is driven, a clutch that is configured to connect and disconnecting power transmission by the power transmission mechanism, and a case provided near a high-temperature part of the engine such that a shaft of the expander and that of the refrigerant pump are coaxially arranged, the clutch, the refrigerant pump and the expander are integrally housed in this order and the expander has a higher temperature than the clutch.

6 Claims, 17 Drawing Sheets

(51) Int. Cl.
  *F01K 23/18* (2006.01)
  *F01N 5/02* (2006.01)
  *F02G 5/04* (2006.01)
  *F01K 23/06* (2006.01)
  *F01K 23/14* (2006.01)
  *F02C 6/18* (2006.01)

(52) U.S. Cl.
  CPC ... *F01N 5/02* (2013.01); *F02C 6/18* (2013.01); *F02G 5/04* (2013.01); F01N 2340/04 (2013.01); Y02T 10/16 (2013.01); Y02T 10/166 (2013.01)

(56) References Cited

U.S. PATENT DOCUMENTS

| | | | |
|---|---|---|---|
| 2004/0184923 A1* | 9/2004 | Iwanami | B60H 1/3223 417/221 |
| 2004/0187506 A1* | 9/2004 | Iwanami | B60H 1/3222 62/236 |
| 2006/0073050 A1 | 4/2006 | Iwanami et al. | |

FOREIGN PATENT DOCUMENTS

| | | |
|---|---|---|
| JP | 2010-216448 A | 9/2010 |
| WO | WO 2007/141470 A2 | 12/2007 |

\* cited by examiner

ENGINE WASTE-HEAT UTILIZATION DEVICE

TECHNICAL FIELD

This invention relates to an engine-waste-heat utilization device including a Rankine cycle.

BACKGROUND ART

In a Rankine cycle of JP2005-030386A issued in 2005 by the Japan Patent Office, a refrigerant pump and an expander are housed in one sealed case.

SUMMARY OF INVENTION

However, a position of an engine at which the sealed case is provided is not disclosed in JP2005-030386A at all.

The present invention was developed, focusing on such a conventional problem. An object of the present invention is to provide an engine-waste-heat utilization device optimal for a thermal requirement of each component in a case.

An engine-waste-heat utilization device according to one aspect of the present invention includes a Rankine cycle with a heat exchanger that is configured to recover waste-heat of an engine to refrigerant, an expander that is configured to generate power using the refrigerant coming out from the heat exchanger, a condenser that is configured to condense the refrigerant coming out from the expander and a refrigerant pump that is configured to supply the refrigerant coming out from the condenser to the heat exchanger by being driven by the expander, a power transmission mechanism that is configured to transmit surplus power to the engine when the expander has spare power even if the refrigerant pump is driven and a clutch that is configured to connect and disconnecting power transmission by the power transmission mechanism. The engine-waste-heat utilization device also includes a case provided near a high-temperature part of the engine such that a shaft of the expander and that of the refrigerant pump are coaxially arranged, the clutch, the refrigerant pump and the expander are integrally housed in this order and the expander has a higher temperature than the clutch.

Embodiments of the present invention and advantages thereof are described in detail below with reference to the accompanying drawings.

DESCRIPTION OF EMBODIMENTS

First Embodiment

Figure 1:
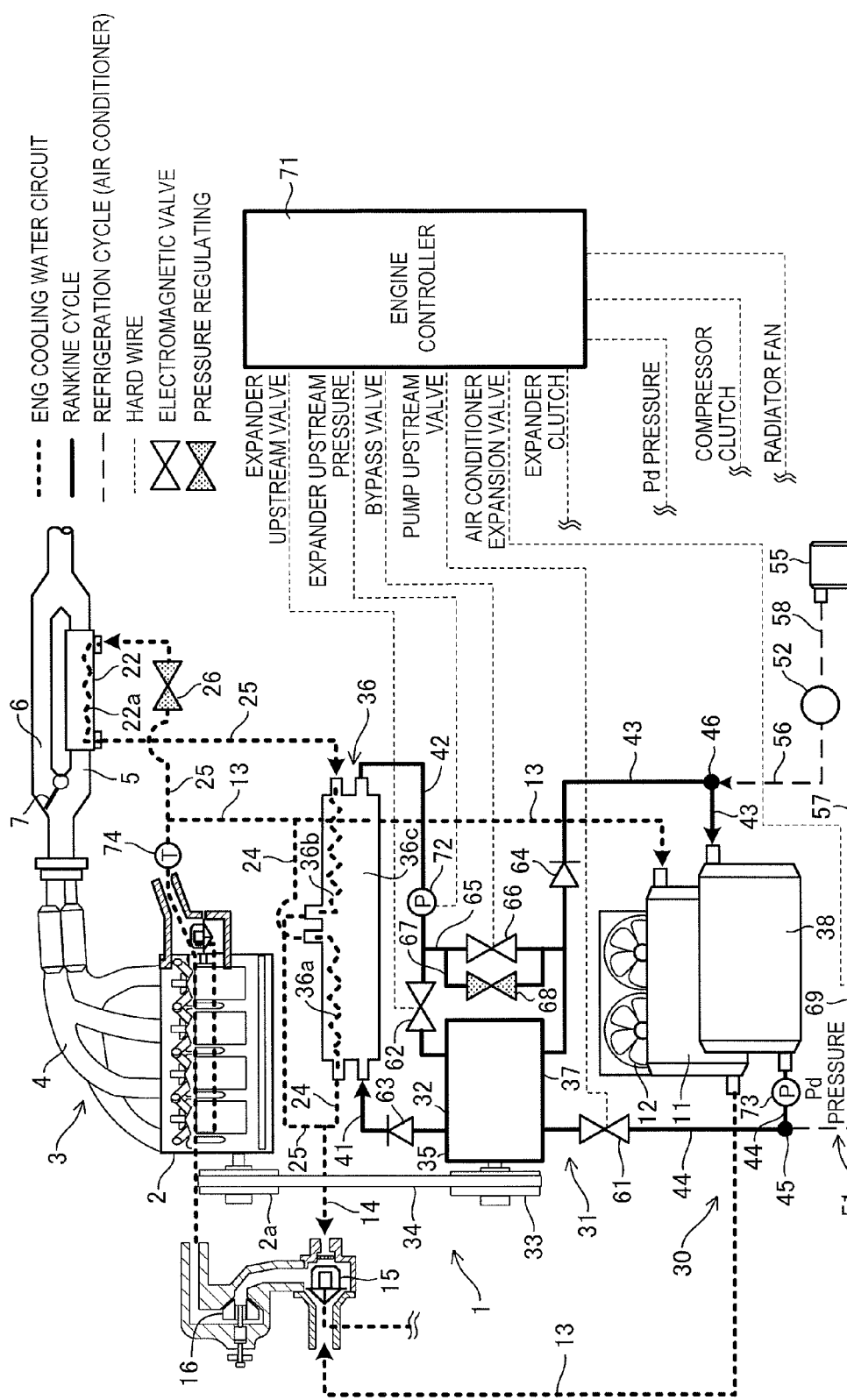
FIG. 1 is a schematic configuration diagram showing an entire system of a Rankine cycle of a first embodiment of the present invention.

FIG. 1 is a schematic configuration diagram showing an entire system of a Rankine cycle which is a premise of the present invention.

A Rankine cycle 31 and a refrigeration cycle 51 of FIG. 1 share refrigerant and a condenser 38. A cycle obtained by integrating the Rankine cycle 31 and the refrigeration cycle 51 is referred to as an integrated cycle 30 hereinafter. The integrated cycle 30 indicates an entire system including passages and the like for cooling water and exhaust gas in addition to passages in which the refrigerant of the Rankine cycle 31 and the refrigeration cycle 51 is circulated and constituent elements such as pumps, expanders and condensers provided at intermediate positions of the passages.

Figure 4:
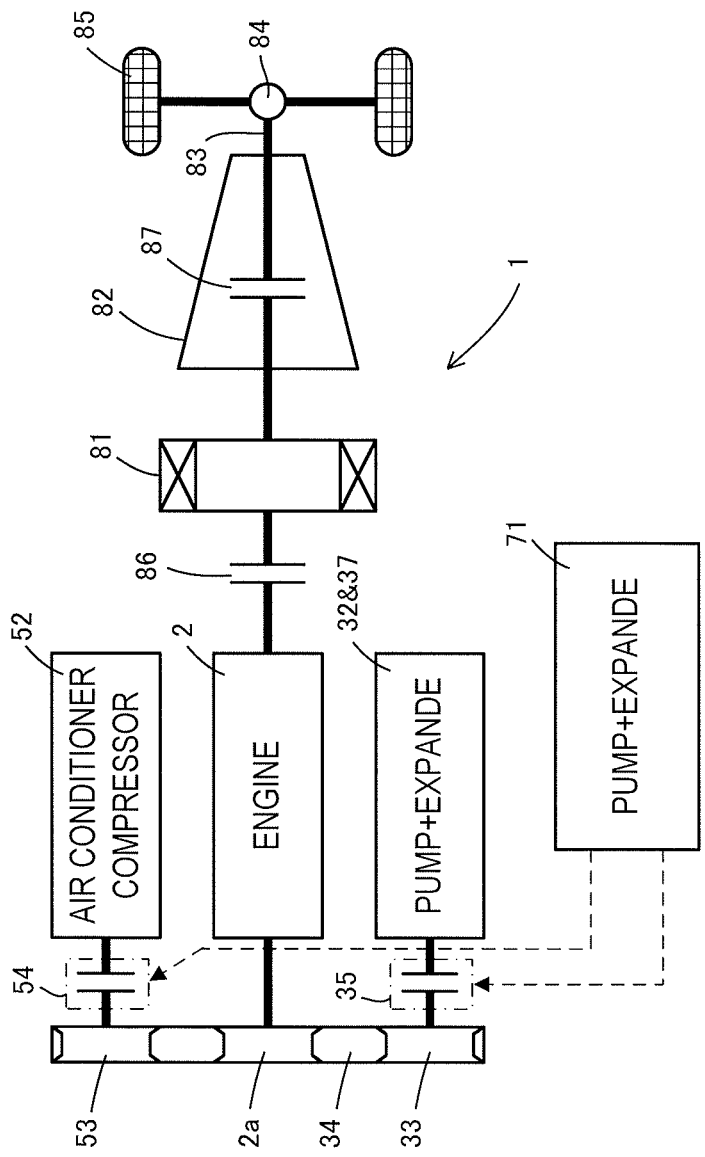
FIG. 4 is a schematic configuration diagram of a hybrid vehicle.

FIG. 4 is a schematic configuration diagram of a hybrid vehicle 1 in which the integrated cycle 30 is mounted.

In the hybrid vehicle 1, an engine 2, a motor generator 81 and an automatic transmission 82 are coupled in series. An output of the automatic transmission 82 is transmitted to drive wheels 85 via a propeller shaft 83 and a differential gear 84. A first drive shaft clutch 86 is provided between the engine 2 and the motor generator 81. Further, a second drive shaft clutch 87 is provided in the automatic transmission 82. This second drive shaft clutch 87 is one of frictional engagement elements of the automatic transmission 82.

Connection and disconnection (connected states) of the first and second drive shaft clutches 86, 87 are controlled by a command of an engine controller 71 according to a driving condition of the hybrid vehicle. When the hybrid vehicle 1 is in an EV running region where the efficiency of the engine 2 is poor as shown in FIG. 7B, a stop is made, the first drive shaft clutch 86 is disconnected and the second drive shaft clutch 87 is connected, whereby the hybrid vehicle 1 runs only with a drive force of the motor generator 81.

When an engine rotation speed increases and a transition is made to a Rankine cycle operating region, the Rankine cycle 31 (to be described later) is operated by operating the engine 2.

Figure 6:
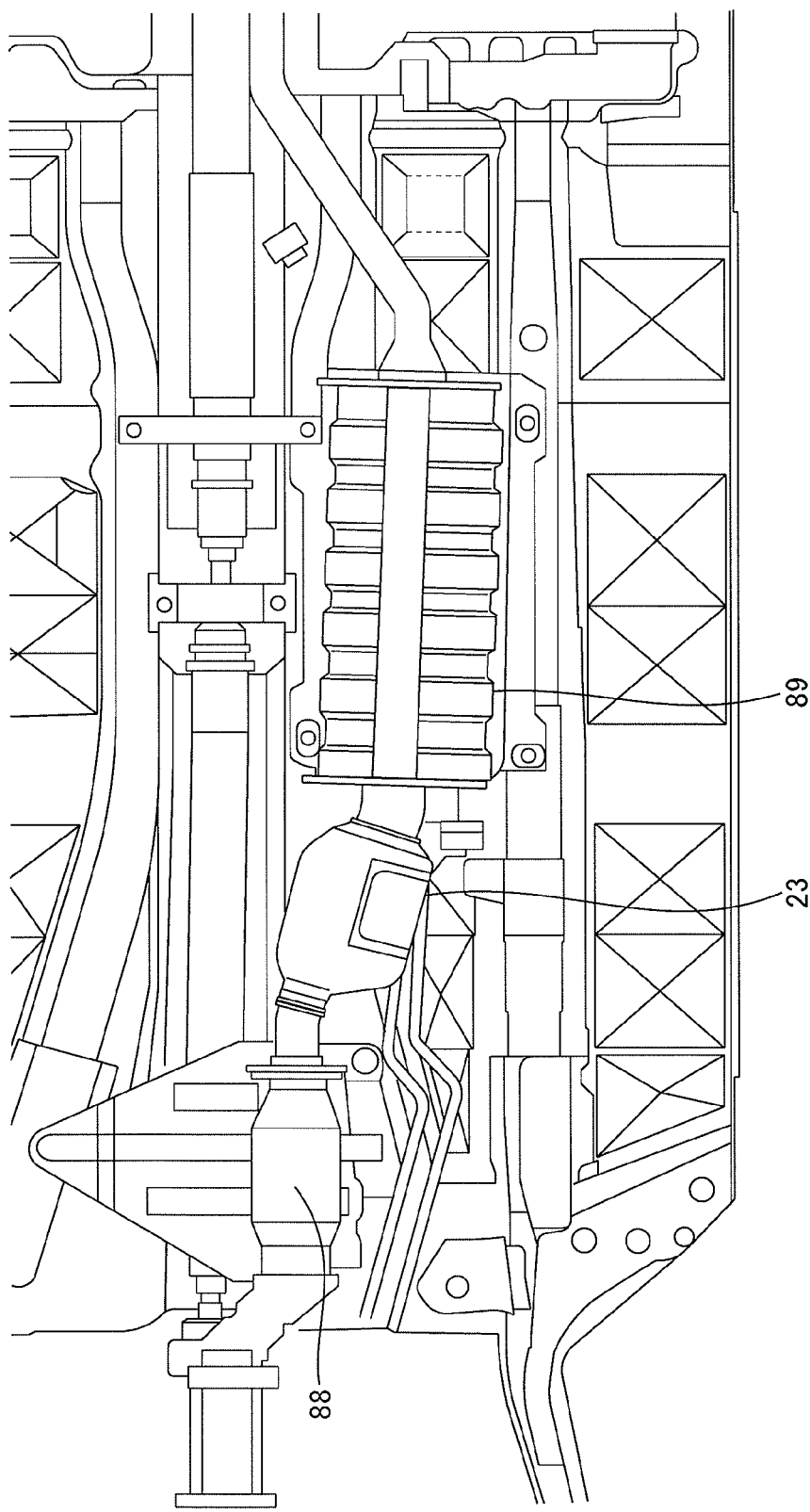
FIG. 6 is a schematic diagram of the engine when viewed from below.

As shown in FIG. 1, an exhaust passage 3 of the engine 2 includes an exhaust manifold 4, an exhaust pipe 5 and a bypass exhaust pipe 6. The exhaust pipe 5 is connected to a collection part of the exhaust manifold 4. The bypass exhaust pipe 6 is branched off at an intermediate position of the exhaust pipe 5 and joins the exhaust pipe 5 again. An waste-heat recovery device 22 is provided in a section of the exhaust pipe 5 bypassed by the bypass exhaust pipe 6. The waste-heat recovery device 22 performs heat exchange between exhaust gas and cooling water. A unit obtained by uniting the waste-heat recovery device 22 and the bypass exhaust pipe 6 is called an waste-heat recovery unit 23. As shown in FIG. 6, the waste-heat recovery unit 23 is arranged between an underfloor catalyst 88 and a sub-muffler 89.

Next, an engine cooling water passage is described based on FIG. 1. The engine cooling water passage includes a cooling water passage 13 passing through a radiator 11 and a bypass cooling water passage 14 bypassing the radiator 11. The bypass cooling water passage 14 includes a first bypass cooling water passage 24 and a second bypass cooling water passage 25. The first bypass cooling water passage 24 is branched off from the cooling water passage 13 and directly connected to a heat exchanger 36 to be described later. The second bypass cooling water passage 25 is branched off from the cooling water passage 13 and connected to the heat exchanger 36 by way of the waste-heat recovery device 22.

Next, the flow of engine cooling water is described based on FIG. 1. Cooling water coming out from the engine 2 has a temperature of about 80 to 90° C. The cooling water separately flows in the cooling water passage 13 and the bypass cooling water passage 14. Thereafter, two flows join again in a thermostat valve 15. The thermostat valve 15 determines an allocation of flow rates of the cooling water flowing in the cooling water passage 13 and the bypass cooling water passage 14. The joined cooling water is returned to the engine 2 by way of a cooling water pump 16. The cooling water pump 16 is driven by the engine 2. A rotation speed of the cooling water pump 16 is synchronized with the engine rotation speed. The thermostat valve 15 relatively increases an amount of the cooling water passing through the radiator 11 by increasing a valve opening on the side of the cooling water passage 13 when a cooling water temperature is high. Further, the thermostat valve 15 relatively decreases the amount of the cooling water passing through the radiator 11 by reducing the valve opening on the side of the cooling water passage 13 when the cooling water temperature is low. When the cooling water temperature is particularly low such as before the warm-up of the engine 2, the thermostat valve 15 is fully closed on the side of the cooling water passage 13. As a result, the cooling water completely bypasses the radiator 11 and a total amount of the cooling water flows in the bypass cooling water passage 14.

It should be noted that the thermostat valve 15 is configured not to be completely closed on the side of the bypass cooling water passage 14. Thus, even if the flow rate of the cooling water flowing through the radiator 11 increases, the flow of the cooling water flowing in the bypass cooling water passage 14 is not completely stopped.

Next, the heat exchanger 36 is described. The heat exchanger 36 performs heat exchange between the refrigerant of the Rankine cycle 31 and the cooling water. The heat exchanger 36 is formed by integrating a heater and a superheater. Specifically, in the heat exchanger 36, cooling water passages 36a, 36b are provided substantially in a row and adjacent to a refrigerant passage 36c of the Rankine cycle 31. Due to such a configuration, the refrigerant and the cooling water can exchange heat. Further, the cooling water passages 36a and 36b and the refrigerant passage 36c are so configured that the refrigerant of the Rankine cycle 31 and the cooling water flow in mutually opposite directions.

In detail, the cooling water passage 36a located on an upstream side (left side of FIG. 1) for the refrigerant of the Rankine cycle 31 is inserted in the first bypass cooling water passage 24. The cooling water coming out from the engine 2 is introduced to a heat exchanger left part formed by the cooling water passage 36a and a refrigerant passage part adjacent to this cooling water passage 36a. This part serves as a heater for heating the refrigerant flowing in the refrigerant passage 36c.

The cooling water having passed through the waste-heat recovery device 22 via the second bypass cooling water passage 25 is introduced to the cooling water passage 36b on a downstream side (right side of FIG. 1) for the refrigerant of the Rankine cycle 31. The cooling water coming out from the engine 2 and heated by exhaust gas is introduced to a heat exchanger right part (downstream side for the refrigerant of the Rankine cycle 31) formed by the cooling water passage 36b and a refrigerant passage part adjacent to this cooling water passage 36b. This part serves as a superheater for overheating the refrigerant flowing in the refrigerant passage 36c.

A cooling water passage 22a of the waste-heat recovery device 22 is provided adjacent to the exhaust pipe 5. The cooling water coming out from the engine 2 and introduced to the cooling water passage 22a of the waste-heat recovery device 22 is heated, for example, up to 110 to 115° C. by the high-temperature exhaust gas. It should be noted that the cooling water passage 22a is so configured that the exhaust gas and the cooling water flow in mutually opposite directions.

A control valve 26 is disposed in the second bypass cooling water passage 25. Further, a cooling water temperature sensor 74 is provided at the exit of the engine 2. An opening of this control valve 26 is reduced when a temperature detected by the cooling water temperature sensor 74 reaches a predetermined value or higher so that an engine water temperature does not exceed a permissible temperature (e.g. 100° C.) for preventing, for example, efficiency deterioration of the engine and the occurrence of knocking. When the engine water temperature approaches the permissible temperature, an amount of the cooling water passing through the waste-heat recovery device 22 is reduced. This can reliably prevent the engine water temperature from exceeding the permissible temperature.

On the other hand, if the cooling water temperature increased by the waste-heat recovery device 22 becomes too high and the cooling water evaporates (boils) due to a reduction in the flow rate of the second bypass cooling water passage 25, efficiency in the heat exchanger 36 drops. Further, the flow of the cooling water in the cooling water passage may become poor and component temperatures may excessively increase. To avoid this, a thermostat valve 7 for controlling an amount of the exhaust gas passing through the waste-heat recovery device 22 and an amount of the exhaust gas passing through the bypass exhaust pipe 6 is provided in a branched part of the bypass exhaust pipe 6. A valve opening of the thermostat valve 7 is adjusted based on the temperature of the cooling water coming out from the waste-heat recovery device 22 so that the temperature of the cooling water coming out from the waste-heat recovery device 22 does not exceed a predetermined temperature (e.g. boiling temperature of 120°).

The heat exchanger 36, the thermostat valve 7 and the waste-heat recovery device 22 are united into the waste-heat recovery unit 23 and arranged at intermediate positions of the exhaust pipe under a substantially central part of a floor in a vehicle width direction. A relatively simple temperature sensitive valve using a bimetal or the like may be used as the thermostat valve 7. Further, a control valve controlled by a controller to which a temperature sensor output is input may be used as the thermostat valve 7. Since an adjustment of a heat exchange amount from the exhaust gas into the cooling water by the thermostat valve 7 is associated with a relatively long delay, it is difficult to prevent the engine water temperature from exceeding the permissible temperature if the thermostat valve 7 is singly adjusted. However, since the control valve 26 in the second bypass cooling water passage 25 is controlled based on the engine water temperature (exit temperature), a heat recovery amount can be quickly reduced to reliably prevent the engine water temperature from exceeding the permissible temperature. Further, if there is a margin between the engine water temperature and the permissible temperature, an waste-heat recovery amount can be increased by performing heat exchange until the temperature of the cooling water coming out from the waste-heat recovery device 22 reaches a high temperature (e.g. 110 to 115° C.) exceeding the permissible temperature of the engine water temperature. The cooling water coming out from the cooling water passage 36b joins the first bypass cooling water passage 24 via the second bypass cooling water passage 25.

If the temperature of the cooling water is sufficiently reduced, the valve opening on the side of the cooling water passage 13 is reduced and the amount of the cooling water passing through the radiator 11 is relatively reduced. The temperature of the cooling water is thought to be sufficiently reduced, for example, because the temperature of the refrigerant of the Rankine cycle 31 is low and heat is exchanged with this refrigerant. If the temperature of the cooling water is increased, the valve opening on the side of the cooling water passage 13 is increased and the amount of the cooling water passing through the radiator 11 is relatively increased. The temperature of the cooling water is thought to be increased, for example, because the Rankine cycle 31 is not operated. Based on such an operation of the thermostat valve 15, the cooling water temperature of the engine 2 is maintained at a suitable temperature and heat is appropriately supplied (recovered) to the Rankine cycle 31.

Next, the integrated cycle 30 is described. The integrated cycle 30 is formed by integrating the Rankine cycle 31 and the refrigeration cycle 51 as described above. The Rankine cycle 31 as a basis is first described and the refrigeration cycle 51 is then described below.

The Rankine cycle 31 is a system for recovering the waste-heat of the engine 2 to the refrigerant through the cooling water of the engine 2 and regenerating the recovered waste-heat as power. The Rankine cycle 31 includes a refrigerant pump 32, the heat exchanger 36 as a superheater, an expander 37 and the condenser 38. These are connected by refrigerant passages 41 to 44 in which the refrigerant (R134a, etc.) is circulated.

Figure 2A:
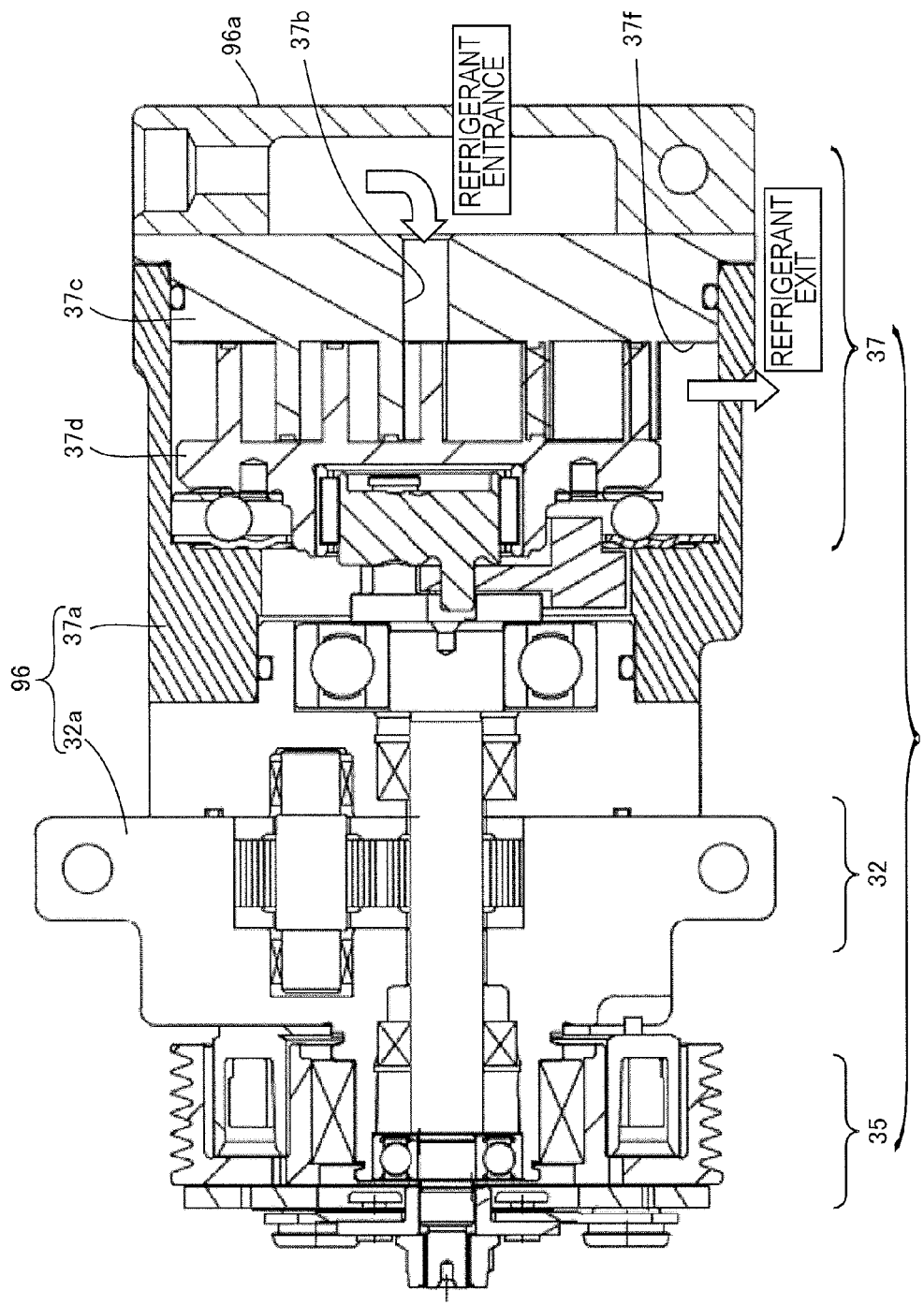
FIG. 2A is a schematic sectional view of an expander pump formed by uniting a pump and an expander.
Figure 2B:
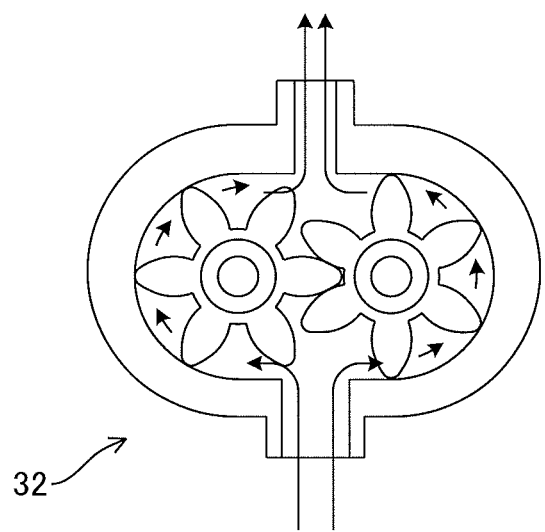
FIG. 2B is a schematic sectional view of a refrigerant pump.
Figure 2C:
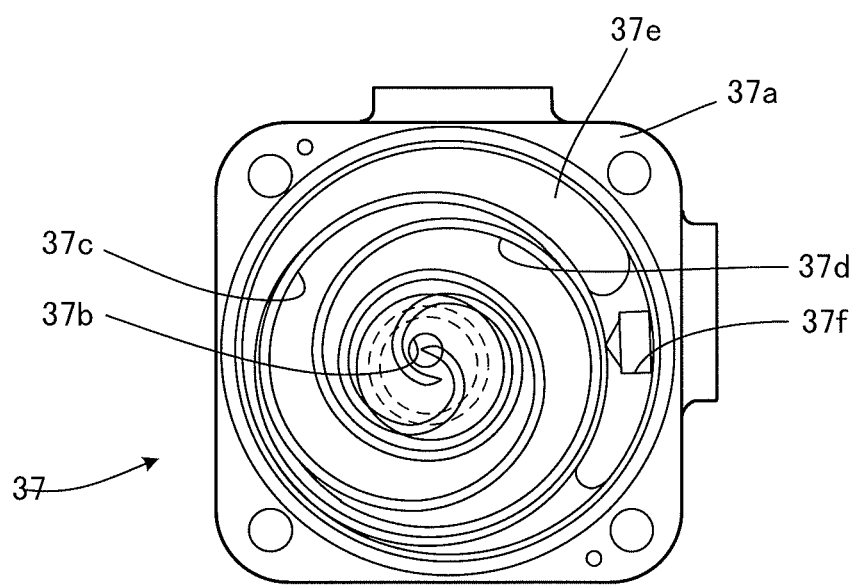
FIG. 2C is a schematic sectional view of the expander.

A shaft of the refrigerant pump 32 is arranged to be coupled to an output shaft of the expander 37 on the same axis (see FIG. 2A). The shaft of the refrigerant pump 32 and the output shaft of the expander 37 are arranged in parallel with an output shaft of the engine 2. A belt 34 is mounted between a pump pulley 33 provided on the tip of the shaft of the refrigerant pump 32 and a crank pulley 2a (see FIG. 1). Due to such a configuration, an output (power) generated by the expander 37 drives the refrigerant pump 32 and drives the output shaft (crankshaft) of the engine 2. It should be noted that the refrigerant pump 32 of the present embodiment is a gear-type pump as shown in FIG. 2B. The expander 37 is a scroll type expander as shown in FIG. 2C.

Further, an electromagnetic clutch (hereinafter, this clutch is referred to as an "expander clutch") 35 is provided between the pump pulley 33 and the refrigerant pump 32. Due to such a configuration, the refrigerant pump 32 and the expander 37 are connectable to and disconnectable from the engine 2 (see FIG. 2A). If the expander clutch 35 is connected when the output generated by the expander 37 exceeds a drive force of the refrigerant pump 32 and the friction of a rotating body and there is surplus power (when a predicted expander torque is positive), the rotation of the engine output shaft can be assisted by the surplus power of the expander 37. By assisting the rotation of the engine output shaft using energy obtained by waste-heat recovery in this way, fuel economy can be improved. Further, energy for driving the refrigerant pump 32 for circulating the refrigerant can also be generated using the recovered waste-heat.

The refrigerant from the refrigerant pump 32 is supplied to the heat exchanger 36 via the refrigerant passage 41. The heat exchanger 36 is a heat exchanger for performing heat exchange between the cooling water of the engine 2 and the refrigerant and evaporating and overheating the refrigerant.

The refrigerant from the heat exchanger 36 is supplied to the expander 37 via the refrigerant passage 42. The expander 37 is a steam turbine for converging heat into rotational energy by expanding the evaporated and overheated refrigerant. The power recovered by the expander 37 drives the refrigerant pump 32 and is transmitted to the engine 2 via a belt transmission mechanism to assist the rotation of the engine 2.

The refrigerant from the expander 37 is supplied to the condenser 38 via the refrigerant passage 43. The condenser 38 is a heat exchanger for performing heat exchange between outside air and the refrigerant and cooling and liquefying the refrigerant. The condenser 38 is arranged in parallel with the radiator 11 and cooled by a radiator fan 12.

The refrigerant liquefied by the condenser 38 is returned to the refrigerant pump 32 via the refrigerant passage 44. The refrigerant returned to the refrigerant pump 32 is fed to the heat exchanger 36 again by the refrigerant pump 32 and is circulated through each constituent element of the Rankine cycle 31.

Next, the refrigeration cycle 51 is described. Since the refrigeration cycle 51 shares the refrigerant circulating in the Rankine cycle 31, the refrigeration cycle 51 is integrated with the Rankine cycle 31 and the configuration thereof is simple. The refrigeration cycle 51 includes a compressor 52, the condenser 38 and an evaporator 55.

The compressor 52 is a fluid machine for compressing the refrigerant of the refrigeration cycle 51 at high temperature and high pressure. The compressor 52 is driven by the engine 2. As shown in FIG. 4, a compressor pulley 53 is fixed to a drive shaft of the compressor 52. The belt 34 is mounted on this compressor pulley 53 and the crank pulley 2a. A drive force of the engine 2 is transmitted to the compressor pulley 53 via this belt 34 to drive the compressor 52. Further, an electromagnetic clutch (hereinafter, this clutch is referred to as a "compressor clutch") 54 is provided between the compressor pulley 53 and the compressor 52. Due to such a configuration, the compressor 52 and the compressor pulley 53 are connectable to and disconnectable from each other.

Referring back to FIG. 1, the refrigerant from the compressor 52 is supplied to the condenser 38 after joining the refrigerant passage 43 via a refrigerant passage 56. The condenser 38 is a heat exchanger for condensing and liquefying the refrigerant by heat exchange with outside air. The liquid refrigerant from the condenser 38 is supplied to the evaporator 55 via a refrigerant passage 57 branched off from the refrigerant passage 44. The evaporator 55 is arranged in a case of an air conditioner unit in the same manner as a heater core. The evaporator 55 is a heat exchanger for evaporating the liquid refrigerant from the condenser 38 and cooling air conditioning air from a blower fan by latent heat of evaporation at that time.

The refrigerant evaporated by the evaporator 55 is returned to the compressor 52 via a refrigerant passage 58. It should be noted that a mixing ratio of the air conditioning air cooled by the evaporator 55 and that heated by the heater core is changed according to an opening of an air mix door to adjust the temperature to a temperature set by a passenger.

The integrated cycle 30 is composed of the Rankine cycle 31 and the refrigeration cycle 51 as described above. Various valves are appropriately provided at intermediate positions of the integrated cycle 30 to control the refrigerant flowing in the cycle. For example, to control the refrigerant circulating in the Rankine cycle 31, a pump upstream valve 61 is provided in the refrigerant passage 44 allowing communication between a refrigeration cycle junction 45 and the refrigerant pump 32 and an expander upstream valve 62 is provided in the refrigerant passage 42 allowing communication between the heat exchanger 36 and the expander 37. Further, a check valve 63 for preventing a reverse flow of the refrigerant from the heat exchanger 36 to the refrigerant pump 32 is provided in the refrigerant passage 41 allowing communication between the refrigerant pump 32 and the heat exchanger 36. A check valve 64 for preventing a reverse flow of the refrigerant from a refrigeration cycle junction 46 to the expander 37 is provided in the refrigerant passage 43 allowing communication between the expander 37 and the refrigeration cycle junction 46. Further, an expander bypass passage 65 is provided which bypasses the expander 37 from a side upstream of the expander upstream valve 62 and joins at a side upstream of the check valve 64, and a bypass valve 66 is provided in this expander bypass passage 65. Furthermore, a pressure regulating valve 68 is provided in a passage 67 bypassing the bypass valve 66. In the refrigeration cycle 51, an air conditioner expansion valve 69 is provided in the refrigerant passage 57 connecting the refrigeration cycle junction 45 and the evaporator 55.

Any of the pump upstream valve 61, the expander upstream valve 62, the bypass valve 66 and the air conditioner expansion valve 69 is an electromagnetic on-off valve. To the engine controller 71 are input a signal indicating an expander upstream pressure detected by a pressure sensor 72, a signal indicating a refrigerant pressure Pd at the exit of the condenser 38 detected by a pressure sensor 73, a rotation speed signal of the expander 37, etc. In the engine controller 71, the compressor 52 of the refrigeration cycle 51 and the radiator fan 12 are controlled and the opening and closing of the pump upstream valve 61, the expander upstream valve 62, the bypass valve 66 and the air conditioner expansion valve 69 are controlled based on each of these input signals according to a predetermined driving condition.

For example, an expander torque (regenerative power) is predicted based on the expander upstream pressure detected by the pressure sensor 72 and the expander rotation speed, and the expander clutch 35 is engaged when this predicted expander torque is positive (the rotation of the engine output shaft can be assisted) and released when the predicted expander torque is zero or negative. Prediction based on the sensor detected pressure and the expander rotation speed has higher accuracy than that based on the exhaust temperature. Thus, the expander clutch 35 can be properly engaged/released according to a generation state of the expander torque (for further details, see JP2010-190185A).

Figure 3:
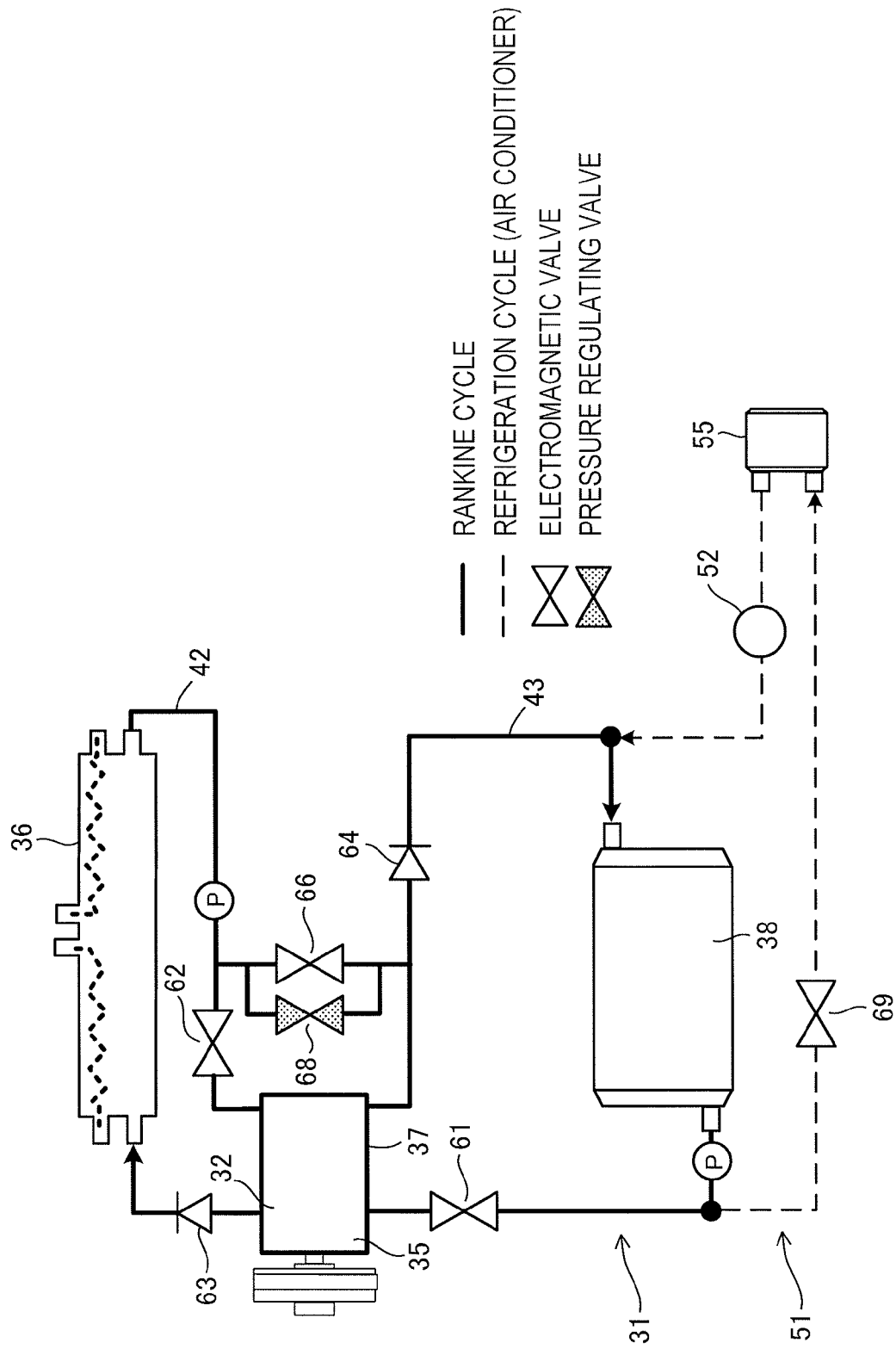
FIG. 3 is a schematic diagram showing functions of refrigerant system valves.

The above four on-off valves (pump upstream valve 61, expander upstream valve 62, bypass valve 66, air conditioner expansion valve 69) and two check valves (check valves 63, 64) are refrigerant system valves. Functions of these refrigerant system valves are shown anew in FIG. 3.

The pump upstream valve 61 prevents an uneven distribution of the refrigerant (containing a lubricant component) to the Rankine cycle 31 by being closed under a predetermined condition that makes the refrigerant easily unevenly distributed to the Rankine cycle 31 as compared with the refrigeration cycle 51. The pump upstream valve 61 closes the Rankine cycle 31 in cooperation with the check valve 64 downstream of the expander 37 as described later. The expander upstream valve 62 cuts off the refrigerant passage 42 to maintain the refrigerant from the heat exchanger 36 until a high pressure is reached when a refrigerant pressure from the heat exchanger 36 is relatively low. This can prompt the heating of the refrigerant even if the expander torque cannot be sufficiently obtained and can shorten, for example, a time until the Rankine cycle 31 is restarted, i.e. a time until regeneration actually becomes possible. The bypass valve 66 shortens a start-up time of the Rankine cycle 31 by being opened to actuate the refrigerant pump 32 after the expander 37 is bypassed such as when an amount of the refrigerant present on the side of the Rankine cycle 31 is insufficient such as at the start-up of the Rankine cycle 31. If a state where the refrigerant temperature at the exit of the condenser 38 or at the entrance of the refrigerant pump 32 is reduced from a boiling point in consideration of a pressure at that location by a predetermined temperature difference (subcool temperature SC) or more is realized by actuating the refrigerant pump 32 after the expander 37 is bypassed, a state is prepared where the liquid refrigerant can be sufficiently supplied to the Rankine cycle 31.

The check valve 63 upstream of the heat exchanger 36 maintains the refrigerant supplied to the expander 37 at a high pressure in cooperation with the bypass valve 66, the pressure regulating valve 68 and the expander upstream valve 62. Under a condition that the regeneration efficiency of the Rankine cycle 31 is low, the operation of the Rankine cycle 31 is stopped and the refrigerant pressure during the stop is increased by closing a section before and after the heat exchanger 36, so that the Rankine cycle 31 can be quickly restarted utilizing the high-pressure refrigerant. The pressure regulating valve 68 functions as a relief valve for allowing the refrigerant having reached an excessively high pressure to escape by being opened when the pressure of the refrigerant supplied to the expander 37 becomes excessively high.

The check valve 64 downstream of the expander 37 prevents an uneven distribution of the refrigerant to the Rankine cycle 31 in cooperation with the aforementioned pump upstream valve 61. If the engine 2 is not warm yet immediately after the operation of the hybrid vehicle 1 is started, the temperature of the Rankine cycle 31 is lower than that of the refrigeration cycle 51 and the refrigerant may be unevenly distributed toward the Rankine cycle 31. A probability of uneven distribution toward the Rankine cycle 31 is not high. However, since it is desired to quickly cool vehicle interior, for example, immediately after the start of the vehicle operation in summer, cooling capacity is required most. In such a situation, it is desired to ensure the refrigerant of the refrigeration cycle 51 by resolving even a slightly uneven distribution of the refrigerant. Accordingly, the check valve 64 is provided to prevent the uneven distribution of the refrigerant toward the Rankine cycle 31.

The compressor 52 is not so structured that the refrigerant can freely pass when the drive is stopped. The compressor 52 can prevent an uneven distribution of the refrigerant to the refrigeration cycle 51 in cooperation with the air conditioner expansion valve 69. This is described. When the operation of the refrigeration cycle 51 is stopped, the refrigerant moves from the Rankine cycle 31 that is in steady operation and has a relatively high temperature to the refrigeration cycle 51, whereby the refrigerant circulating in the Rankine cycle 31 may become insufficient. In the refrigeration cycle 51, the temperature of the evaporator 55 is low immediately after the cooling is stopped and the refrigerant tends to stay in the evaporator 55 that has a relatively large volume and a low temperature. In this case, the uneven distribution of the refrigerant to the refrigeration cycle 51 can be prevented by stopping the drive of the compressor 52 to block a movement of the refrigerant from the condenser 38 to the evaporator 55 and closing the air conditioner expansion valve 69.

Figure 5:
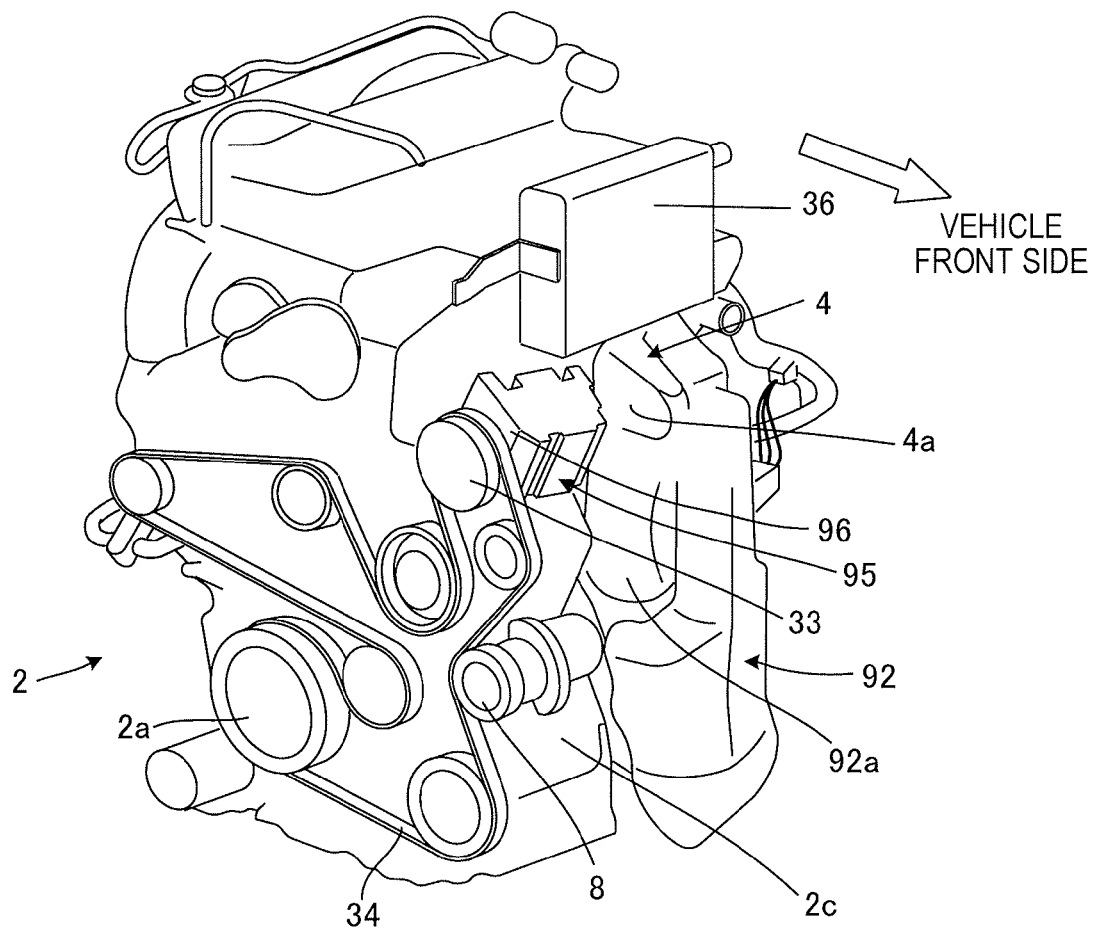
FIG. 5 is a schematic perspective view of an engine.

Next, FIG. 5 is a schematic perspective view of the engine 2 showing an entire package of the engine 2. What is characteristic in FIG. 5 is that the heat exchanger 36 is arranged vertically above the exhaust manifold 4. By arranging the heat exchanger 36 in a space vertically above the exhaust manifold 4, the mountability of the Rankine cycle 31 on the engine 2 is improved. Further, a tension pulley 8 is provided on the engine 2.

Next, a basic operation method of the Rankine cycle 31 is described with reference to FIGS. 7A and 7B.

Figure 7A:
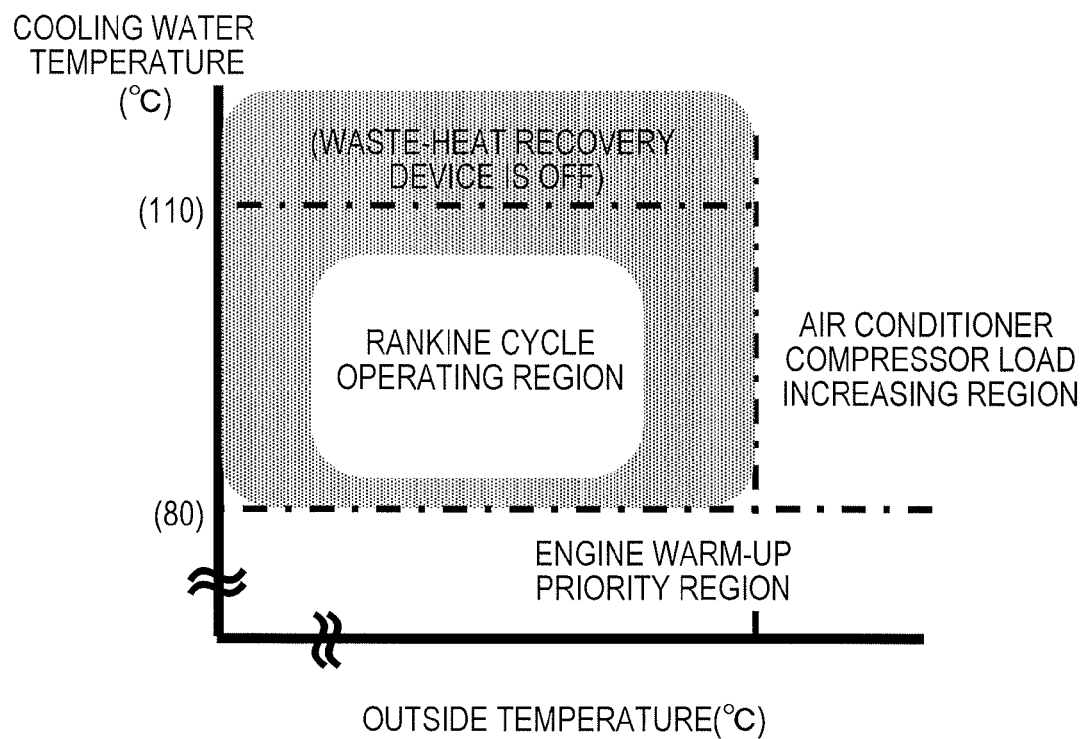
FIG. 7A is a characteristic graph of a Rankine cycle operating region.
Figure 7B:
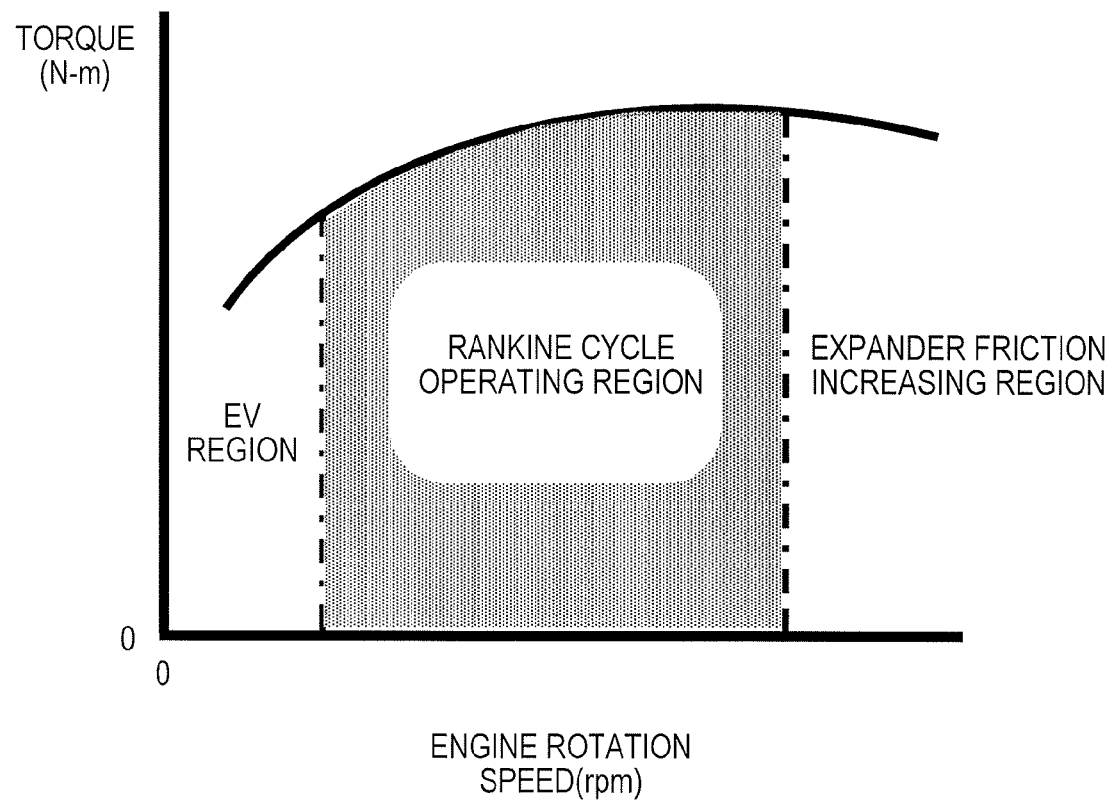
FIG. 7B is a characteristic graph of a Rankine cycle operating region.

First, FIGS. 7A and 7B are graphs showing operating regions of the Rankine cycle 31. A horizontal axis of FIG. 7A represents outside air temperature and a vertical axis represents engine water temperature (cooling water temperature). A horizontal axis of FIG. 7B represents engine rotation speed and a vertical axis represents engine torque (engine load).

The Rankine cycle 31 is operated when both conditions of FIGS. 7A and 7B are satisfied. In FIG. 7A, the operation of the Rankine cycle 31 is stopped in a region on a low water temperature side where the warm-up of the engine 2 is prioritized and a region on a high outside temperature side where a load of the compressor 52 increases. During a warm-up period in which exhaust temperature is low and recovery efficiency is poor, the cooling water temperature is quickly increased rather by not operating the Rankine cycle 31. During a high outside temperature period in which high cooling capacity is required, the Rankine cycle 31 is stopped to provide the refrigeration cycle 51 with sufficient refrigerant and the cooling capacity of the condenser 38. In FIG. 7B, the operation of the Rankine cycle 31 is stopped in the EV running region and a region on a high rotation speed side where the friction of the expander 37 increases since the vehicle is a hybrid vehicle. Since it is difficult to provide the expander 37 with a highly efficient structure having little friction at all the rotation speeds, the expander 37 is so configured (dimensions and the like of each part of the expander 37 are set) in the case of FIG. 7B as to realize small friction and high efficiency in an engine rotation speed region where an operation frequency is high.

Figure 8:
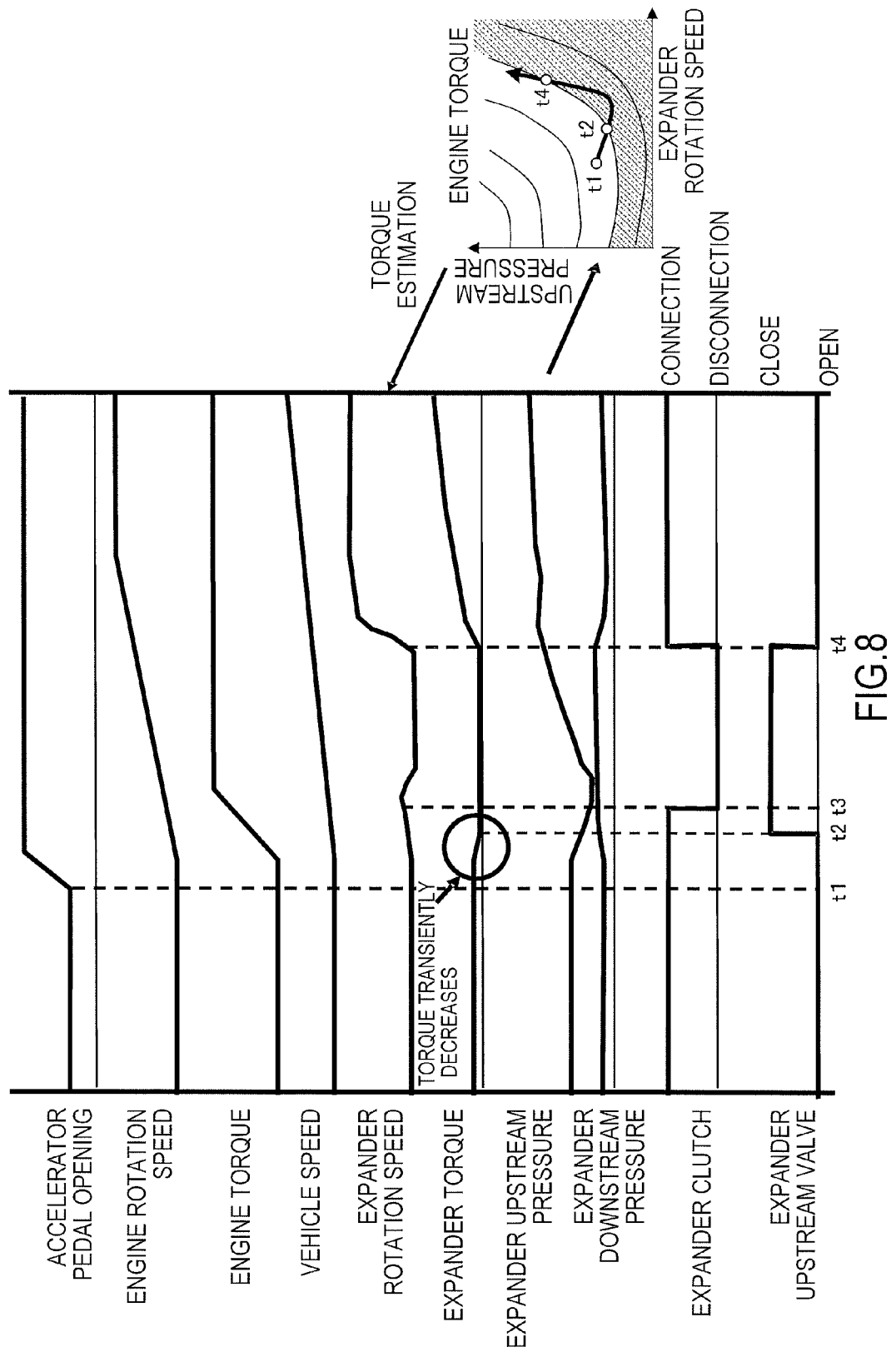
FIG. 8 is a timing chart showing a state where the hybrid vehicle 1 is accelerated while the rotation of an engine output shaft is assisted by an expander torque.

FIG. 8 is a timing chart showing, by modeling, a state where the hybrid vehicle 1 is accelerated while the rotation of the engine output shaft is assisted by the expander torque. It should be noted that a transition of an operating state of the expander 37 at this time is shown on an expander torque map on the right side of FIG. 8. The expander torque tends to become highest in ranges (left upper ranges) where the expander rotation speed is low and the expander upstream pressure is high out of ranges separated by contour lines of the expander torque map. The expander torque tends to become smaller with an increase in the expander rotation speed and a reduction in the expander upstream pressure (toward a right lower side). Particularly, hatched ranges are an area where the expander torque is negative and becomes a load for the engine on the assumption that the refrigerant pump is driven.

Until time t1 at which a driver depresses an accelerator pedal, steady speed running is continued, the expander 37 generates a positive torque and the rotation of the engine output shaft is assisted by the expander torque.

After t1, an increase in the exhaust temperature or the cooling water temperature is delayed with respect to an increase in the engine rotation speed while the rotation speed of the expander 37, i.e. the rotation speed of the refrigerant pump 32 increases in proportion to the engine rotation speed. Thus, a ratio of a recoverable heat amount to an amount of the refrigerant increased by an increase in the rotation speed of the refrigerant pump 32 decreases.

Accordingly, with an increase in the expander rotation speed, the refrigerant pressure upstream of the expander decreases and the expander torque decreases.

If the expander torque is no longer sufficiently obtained due to this reduction in the expander torque (e.g. at timing t2 at which the expander torque becomes nearly zero), deterioration in regeneration efficiency is avoided by switching the expander upstream valve 62 from an open state to a closed state. Specifically, a phenomenon in which the expander 37 is, on the contrary, dragged by the engine 2 with an excessive reduction in the expander torque is avoided.

After the expander upstream valve 62 is switched from the open state to the closed state, the expander clutch 35 is switched from a connected state (engaged state) to a disconnected state (released state) at timing t3. The refrigerant pressure upstream of the expander is sufficiently reduced by somewhat delaying this disconnection timing of the expander clutch 35 from a timing at which the expander upstream valve 62 is switched from the open state to the closed state. This prevents the expander 37 from being excessively rotated when the expander clutch 35 is disconnected. Further, a relatively large amount of the refrigerant is supplied into the heat exchanger 36 by the refrigerant pump 32 and the refrigerant is effectively heated also during the stop of the Rankine cycle 31, whereby the operation of the Rankine cycle 31 can be smoothly resumed.

After t3, the expander upstream pressure increases again due to an increase in a heat radiation amount of the engine 2. At timing t4, the expander upstream valve 62 is switched from the closed state to the open state and the supply of the refrigerant to the expander 37 is resumed. Further, the expander clutch 35 is connected again at t4. By this reconnection of the expander clutch 35, the rotation assist of the engine output shaft by the expander torque is resumed.

Figure 9:
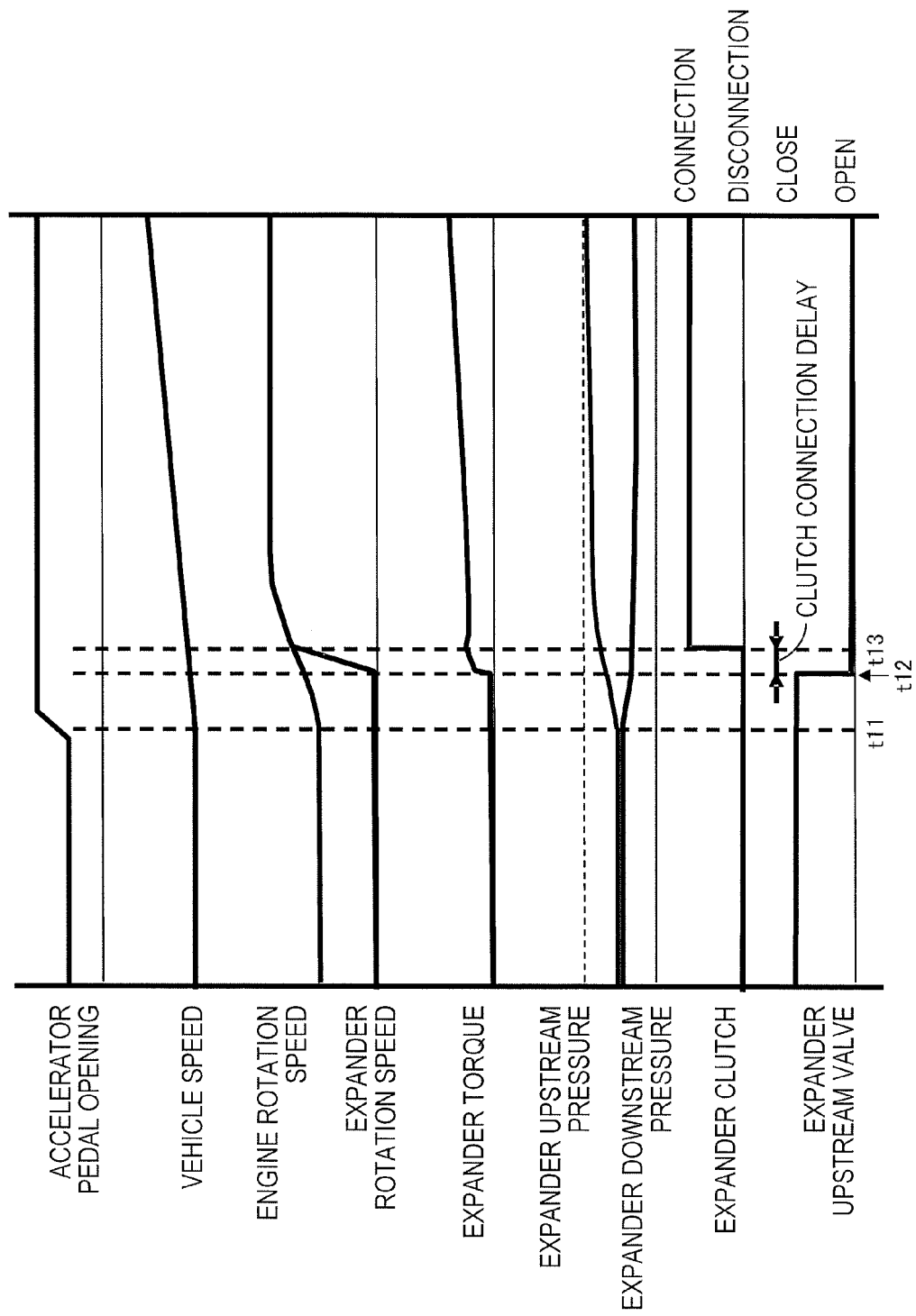
FIG. 9 is a timing chart showing a state where a restart is made after the operation of the Rankine cycle is stopped.

FIG. 9 is a timing chart showing, by modeling, a state where the Rankine cycle 31 is restarted in a manner different from that in FIG. 8 (control at t4) after the operation of the Rankine cycle is stopped with the expander upstream valve 62 closed and the expander clutch 35 disconnected.

An accelerator pedal opening increases when the driver depresses the accelerator pedal at timing t11. At t11, the Rankine cycle 31 is not operated. Thus, the expander torque is kept zero.

The heat radiation amount of the engine 2 increases with an increase in the engine rotation speed from t11, and the temperature of the cooling water flowing into the heat exchanger 36 increases and the temperature of the refrigerant in the heat exchanger 36 increases due to this increase in the heat radiation amount. Since the expander upstream valve 62 is closed, the refrigerant pressure upstream of the expander upstream valve 62, i.e. the expander upstream pressure increases (t11 to t12) due to this increase in the refrigerant temperature by the heat exchanger 36.

A switch is made from a Rankine cycle non-operating region to the Rankine cycle operating region by this change in the operating state. If the expander upstream valve 62 is not provided and the expander clutch 35 is immediately switched from the disconnected state to the connected state to couple the expander 37 to the engine output shaft when a transition is made to the Rankine cycle operating region, the expander 37 becomes a load for the engine 2 and, in addition, a torque shock occurs.

On the other hand, in FIG. 9, the expander upstream valve 62 is not immediately switched from the closed state to the open state when a switch is made to the Rankine cycle operating region. Specifically, the expander upstream valve 62 is kept closed even after a transition is made to the Rankine cycle operating region.

Eventually, a differential pressure between the expander upstream pressure and an expander downstream pressure increases, it is judged that the expander 37 can be operated (driven) at timing t12 at which the differential pressure reaches a predetermined pressure or higher, and the expander upstream valve 62 is switched from the closed state to the open state. By this switch of the expander upstream valve 62 to the open state, the refrigerant with a predetermined pressure is supplied to the expander 37 and the expander rotation speed quickly increases from zero.

The expander clutch 35 is switched from the disconnected state to the connected state at timing t13 at which the expander rotation speed reaches the engine rotation speed due to this increase in the expander rotation speed. If the expander clutch 35 is connected before the rotation speed of the expander 37 is sufficiently increased, the expander 37 becomes an engine load and a torque shock possibly occurs. Contrary to this, by connecting the expander clutch 35 with a delay at t13 at which there is no rotation speed difference from the rotation speed of the engine output shaft, it can be prevented that the expander 37 becomes an engine load and a torque shock occurs in association with the engagement of the expander clutch 35.

Figure 10:
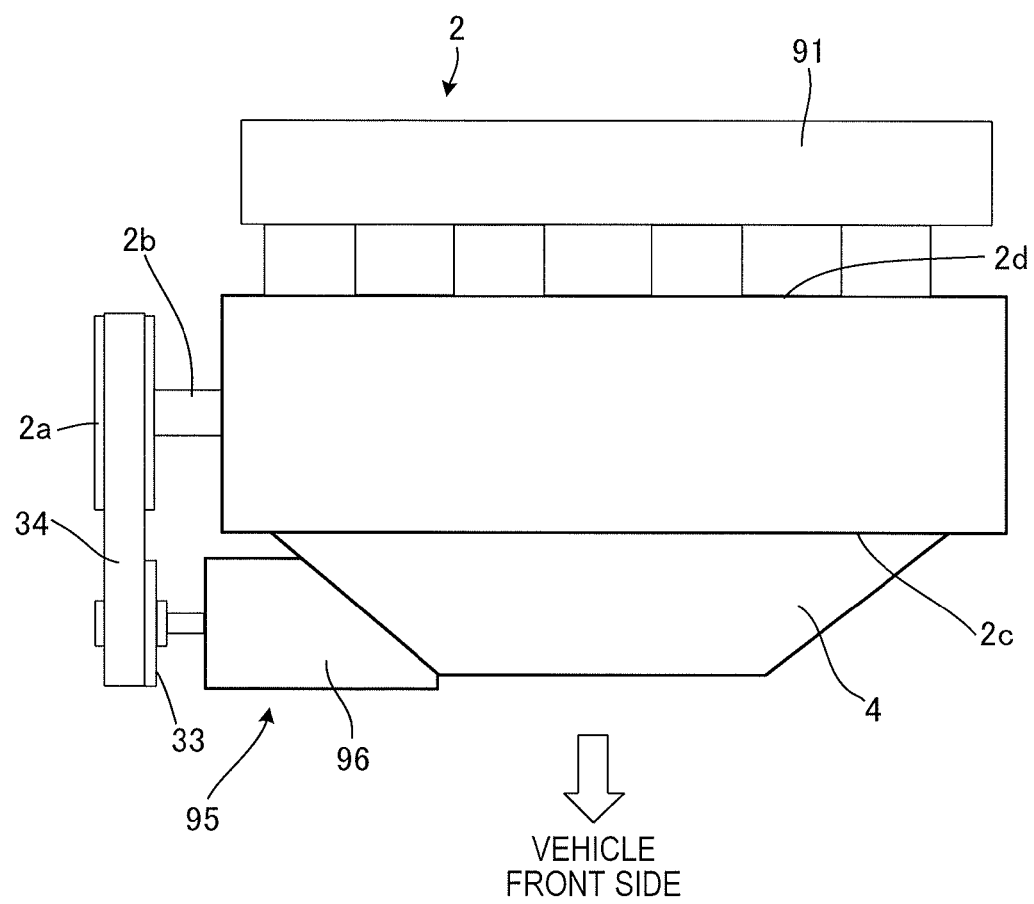
FIG. 10 is a schematic plan view of one engine of the first embodiment.
Figure 11:
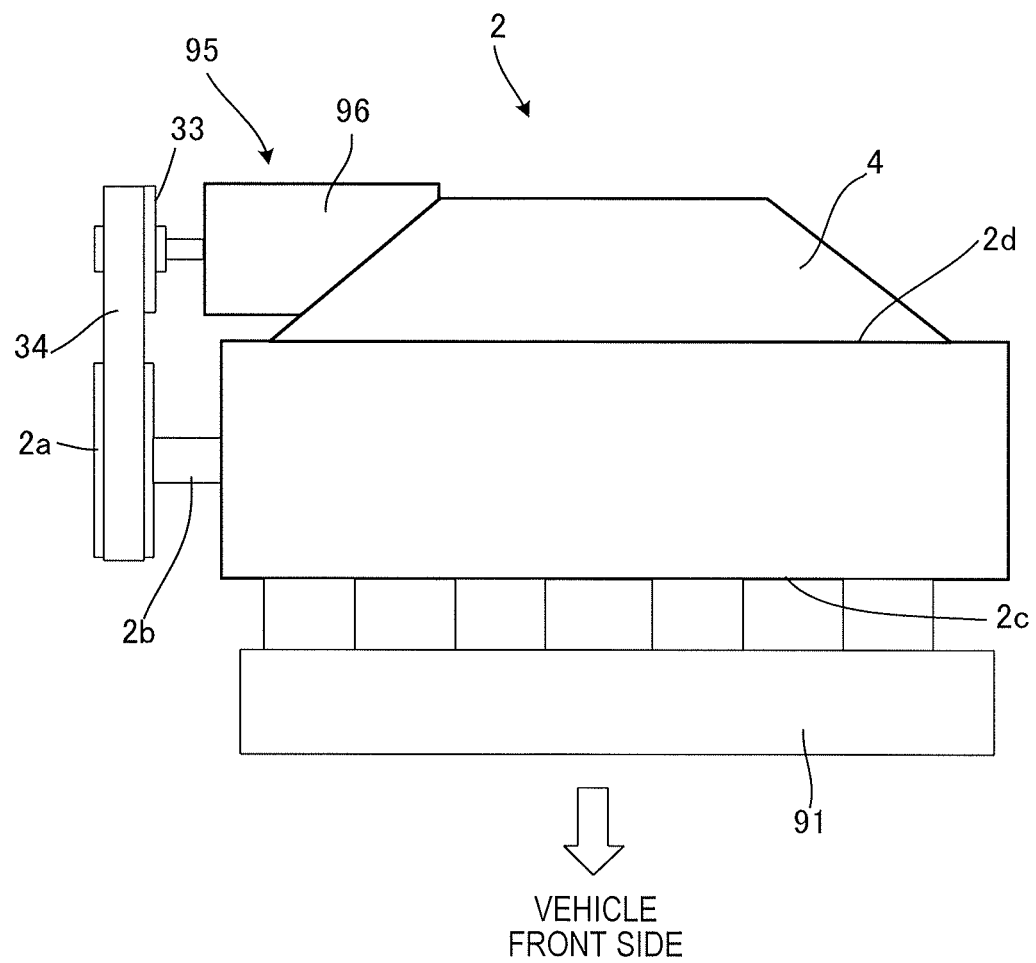
FIG. 11 is a schematic plan view of another engine of the first embodiment.

FIGS. 10 and 11 are schematic plan views (views viewed from vertically above) of engines 2 of the first embodiment. The in-line four cylinder engine 2 is a so-called transverse engine mounted to extend in a direction perpendicular to a vehicle running direction. In this engine 2, the exhaust manifold 4 is arranged on a vehicle front side and an intake manifold 91 is arranged on a vehicle rear side as shown in FIG. 10. Alternatively, the exhaust manifold 4 is arranged on the vehicle rear side and the intake manifold 91 is arranged on the vehicle front side as shown in FIG. 11. It should be noted that the engine 2 of FIG. 10 is the same as the engine 2 shown in FIG. 5.

In such engine arrangements, as shown in FIGS. 1, 2A, 5 and 10, the expander clutch 35, the refrigerant pump 32 and the expander 37 are arranged in this order and integrally housed in a case 96 to form an expander pump 95. The expander pump 95 has a substantially columnar shape as a whole. A shaft of the expander pump is arranged in parallel with an output shaft 2b of the engine 2.

Here, the "shaft of the expander pump" means a shaft of the expander clutch 35, the shaft of the refrigerant pump 32 and the output shaft of the expander 37. As shown in FIG. 2A, the case 96 includes an expander housing 37a of the expander 37 and a pump housing 32a of the refrigerant pump 32. Here, the pump housing 32a doubles as a clutch housing of the expander clutch 35.

In the first embodiment, an expander side end part 96a (see FIG. 2A) of the case 96 is further provided close to a left side surface 4a (see FIG. 5) of the exhaust manifold 4 when viewed from an engine front surface 2c in the case shown in FIG. 10 and provided close to a right side surface of the exhaust manifold 4 when viewed from an engine rear surface 2d in the case shown in FIG. 11. The case 96 of the expander pump 95 is provided in this way because thermal requirements for two components (expander clutch 35, expander 37) of the expander pump 95 differ.

Next, new considerations on different thermal requirements for the two components (expander clutch 35, expander 37) of the expander pump 95 by the present inventors are described.

If three components (expander clutch 35, refrigerant pump 32, expander 37) are integrally housed in the case 96, a configuration is simple and cost is suppressed. However, thermal requirements for two components (expander clutch 35, expander 37) differ.

Gas refrigerant at the exit of the heat exchanger 36 is supplied to the expander 37 via the refrigerant passage 42. The gas refrigerant flowing in the refrigerant passage 42 is preferably supplied to the entrance of the expander 37 without a reduction in temperature. This is because the expander rotation speed decreases if the refrigerant is cooled before reaching the entrance of the expander 37 since the expander rotation speed depends on the temperature and pressure of the gas refrigerant at the entrance of the expander 37.

Here, the expander 37 is a so-called scroll type expander in which two scrolls composed of a fixed scroll 37c and a movable scroll 37d are engaged as also shown in FIGS. 2A and 2C. The high-pressure gas refrigerant coming out from the heat exchanger 36 enters an intake port 37b provided in a center of the expander side end part 96a (see FIG. 2A) of the case 96. The intake port 37b is a cylindrical space provided near the shaft of the expander 37 and in parallel with the shaft of the expander 37. The high-pressure gas refrigerant having entered this intake port 37b expands in a working chamber formed by the engagement of the two scrolls. By that expansion energy, the movable scroll 37d is driven and rotated. Then, the gas refrigerant moves to an outer peripheral side and exits to the outside from a discharge port 37f provided on the peripheral edge of the expander housing 37a through a discharge passage 37e.

Since the expander clutch 35 connects and disconnects power transmission using a frictional force between two members, frictional heat is generated between the two members when power transmission is connected. In this case, the frictional force decreases with a temperature increase of the two members. That is, in order for the expander clutch 35 to reliably connect and disconnect power transmission, the expander clutch 35 is preferably provided at a position least exposed to high heat.

Since the thermal requirement clearly differs between the expander 37 and the expander clutch 35 as just described, it is important to provide the expander pump 95 at an optimal position of the engine 2 so as to be able to meet the thermal requirements of the two components (expander clutch 35, expander 37) in the expander pump 95.

In this case, there is a conventional device in which a refrigerant pump and an expander are housed in one sealed case. However, a position of an engine at which the sealed case is provided is not disclosed at all.

Accordingly, in the present embodiment, the case 96 of the expander pump 95 is provided in a high-temperature part of the engine 2 as shown in FIGS. 10 and 11. As a result, the expander 37 has a relatively higher temperature than the expander clutch 35. More specifically, the case 96 is provided such that the intake port 37b of the expander 37 is close to the high-temperature part of the engine. This makes it difficult for heat of the gas refrigerant flowing in the refrigerant passage 42 to escape from the refrigerant passage 42 before entering the intake port 37d of the expander. Here, the "high-temperature part of the engine" is firstly the exhaust manifold 4 for collecting and discharging exhaust gas of each cylinder and secondly a manifold catalyst 92 connected to an exhaust manifold collection part.

This is described with reference to FIG. 5. In FIG. 5, an oblique right lower side is the vehicle front side. The exhaust manifold 4 is provided on the vehicle front side, i.e. on the engine front surface 2*c*. The manifold catalyst 92 is connected in a vertical direction (vertical direction in FIG. 5) to the collection part of the exhaust manifold 4 located vertically above the engine front surface 2*c*. A side of the exhaust manifold 4 seen on the front side is the left side surface 4*a* of the exhaust manifold 4. A back side (unseen side) is the right side surface of the exhaust manifold 4. The expander side end part 96*a* of the case 96 is provided close to the left side surface 4*a* out of these.

Here, functions and effects of the present embodiment are described.

According to the present embodiment, the case 96 in which the shaft of the expander and the shaft of the refrigerant pump are coaxially arranged and the expander clutch 35, the refrigerant pump 32 and the expander 37 are integrally housed in this order is provided near the exhaust manifold 4 (high-temperature part of the engine) such that the expander 37 has a higher temperature than the expander clutch 35. Since such a configuration is adopted, the escape of the heat from the refrigerant before entering the intake port 37*b* (expander entrance) of the expander 37 is suppressed to prevent a reduction in heat recovery efficiency of the expander 37. Further, the frictional heat generated in the expander clutch 35 is allowed to easily escape and the reliability of the expander clutch 35 is improved.

That is, according to the present embodiment, the case 96 is provided such that the intake port 37*b* of the expander 37 is close to the exhaust manifold 4 (high-temperature part of the engine). Due to such a configuration, heat is less likely to escape from the intake port 37*b* and heat recovery efficiency of the expander 37 is improved.

Further, since the pump in which fluid having a relatively low temperature flows is sandwiched between the expander and the clutch, the flow of heat from the expander to the clutch is effectively suppressed.

In the engine 2, four (a plurality of) cylinders are arranged in line. The engine 2 includes the exhaust manifold 4 for collecting and discharging exhaust gas of the four cylinders. The case 96 is provided such that the shaft (coaxially arranged shaft) of the expander pump 95 and the output shaft 2*b* of the engine 2 are arranged in parallel and the expander side end part 96*a* of the case 96 is close to the exhaust manifold 4. Since such a configuration is adopted, a power transmission mechanism (crank pulley 2*a*, pump pulley 33, belt 34) for transmitting power regenerated by the expander 37 to the engine 2 is easily configured. Further, the expander 37 can effectively receive heat due to radiation heat from the exhaust manifold 4 having a high temperature and an ambient temperature.

Second Embodiment

Figure 12:
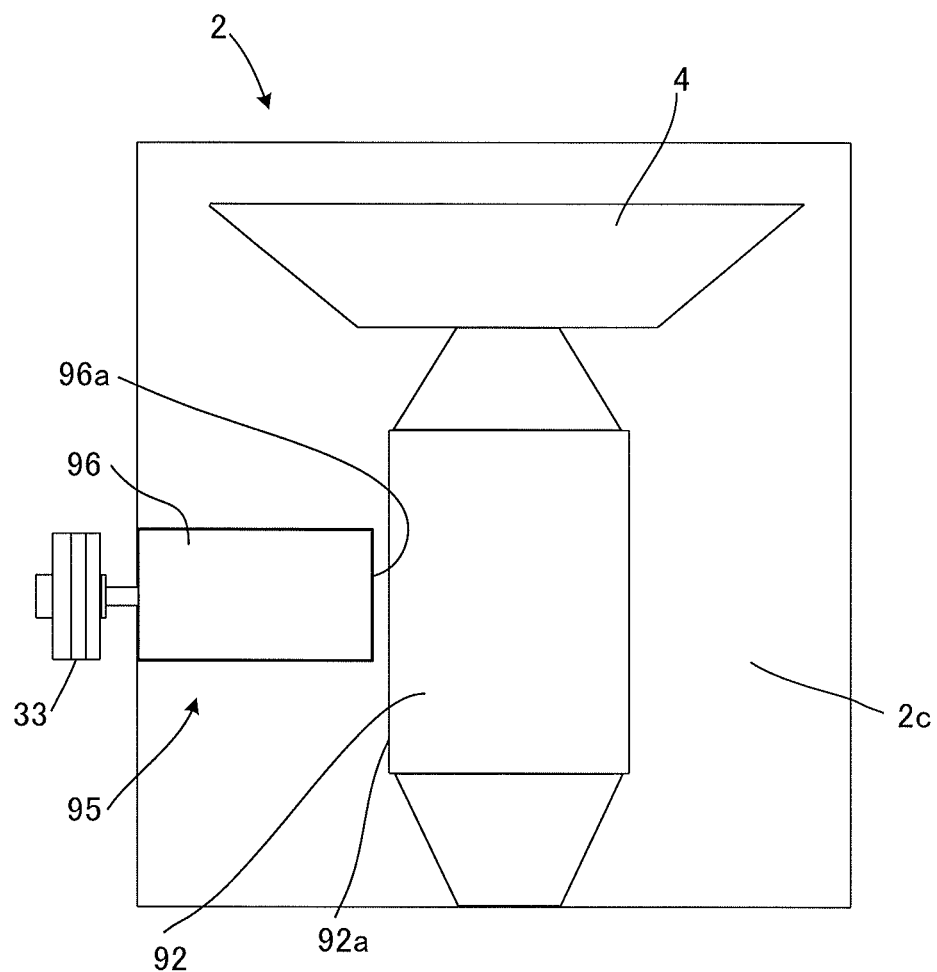
FIG. 12 is a schematic front view of an engine of a second embodiment.

FIG. 12 is a schematic front view of an engine 2 of a second embodiment when viewed from a vehicle front side. The in-line four cylinder engine 2 of the second embodiment is the same as the engine 2 shown in FIG. 10. Specifically, as also shown in FIG. 5, an exhaust manifold 4 is seen vertically above an engine front surface 2*c* and a manifold catalyst 92 is connected in a vertical direction (vertical direction in FIG. 12) to a collection part of this exhaust manifold 4.

In such an engine arrangement, a shaft of an expander pump 95 is arranged in parallel to an output shaft of the engine 2 in the second embodiment. Further, an expander side end part 96*a* of a case 96 of the expander pump is provided close to a left side surface 92*a* of the manifold catalyst 92.

According to the second embodiment, a power transmission mechanism (crank pulley 2*a*, pump pulley 33, belt 34) for transmitting power regenerated by an expander 37 to the engine 2 is easily configured. Further, the expander 37 can effectively receive heat due to radiation heat from the manifold catalyst 92 having a high temperature and an ambient temperature.

Third Embodiment

Figure 13:
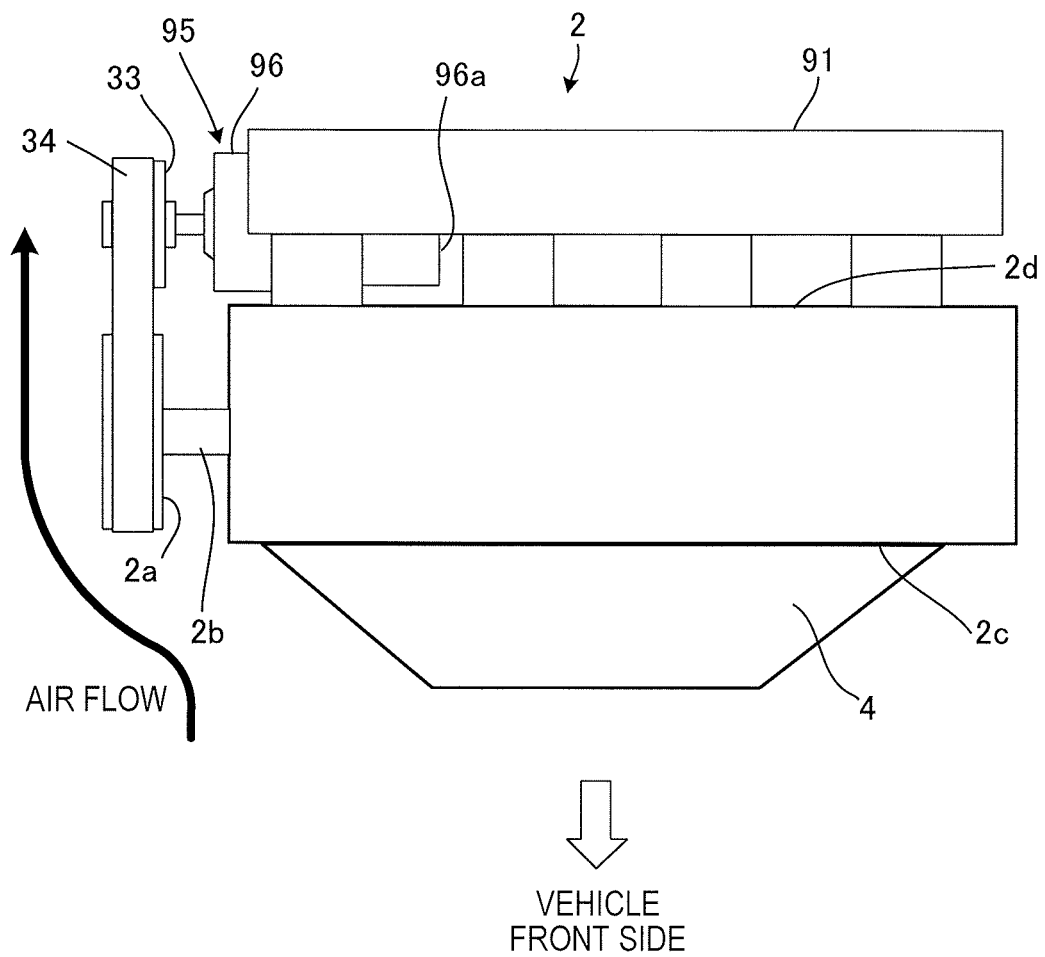
FIG. 13 is a schematic plan view of an engine of a third embodiment.

FIG. 13 is a schematic plan view of an engine 2 of a third embodiment (view viewed from vertically above), and this engine is replaceable with that of the first embodiment shown in FIG. 10. The same parts as in FIG. 10 are denoted by the same reference signals.

Also in the third embodiment, a shaft of an expander pump 95 is arranged in parallel with an output shaft 2*b* of the engine 2. Further, a case 96 of the expander pump 95 is provided vertically below an exhaust manifold 91 and along an engine rear surface 2*d*.

According to the third embodiment, the engine is transversely mounted in a vehicle so that the exhaust manifold is located on a vehicle front side and an intake manifold is located on a vehicle rear side, and the case 96 is provided on the engine rear surface 2*d*. If such a configuration is adopted, traveling air passes on an expander clutch 35 side of the case 96 (left side in FIG. 13) to cool the expander clutch 35 when a vehicle 1 runs. Further, the traveling air is blocked by the engine 2 on an expander 37 side (right side in FIG. 13). Thus, the expander 37 side is less likely to be cooled by the traveling air. This can make the expander 37 side of the case 96 have a relatively higher temperature than the expander clutch 35 side.

Fourth Embodiment

Figure 14:
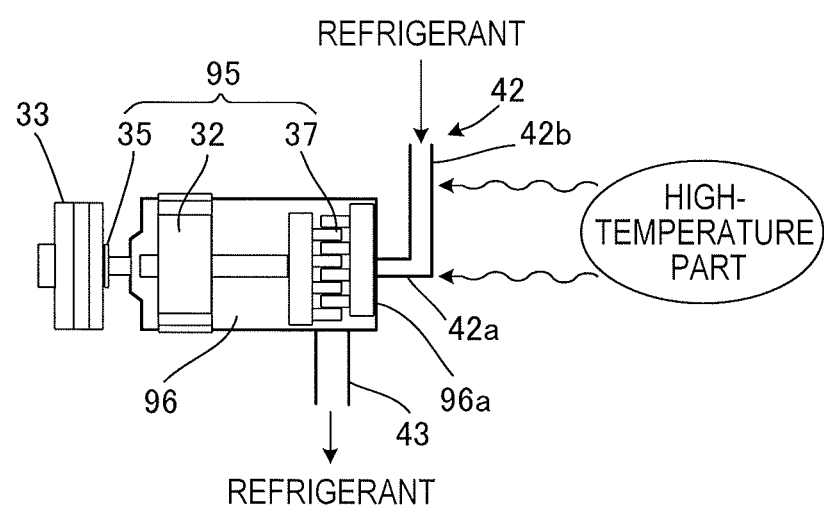
FIG. 14 is a schematic diagram extractively showing two refrigerant passages connected to an expander pump and an expander of the fourth embodiment.

FIG. 14 is a schematic diagram extractively showing a refrigerant passage 42 and a refrigerant passage 43 connected to the expander pump 95 and the expander 37 of the fourth embodiment. A "high-temperature part" of FIG. 14 is an exhaust manifold 4 and a manifold catalyst 92. It should be noted that a see-through case 96 is shown in FIG. 14 to clarify a relationship with the refrigerant passage 43.

In the fourth embodiment, a first part 42*a* close to an intake port 37*b* (see FIG. 2A) of the expander 37 out of the refrigerant passage 42 connected to the intake port 37*b* is provided to be located at the same position as an axis of the cylindrical intake port 37*b*. That is, the first part 42*a* is arranged on a straight line with the axis of the intake port 37*b*. A second part 42*b* connected to the first part 42*a* is provided perpendicular to the first part 42*a*.

According to the fourth embodiment, an expander side end part 96*a* of the case 96 provided with the intake port 37*b*, in which the refrigerant has a highest temperature, out of the expander 37 is easily provided close to the exhaust manifold 4 and the manifold catalyst 92 (high-temperature part of the engine).

Further, since the gas refrigerant can be linearly taken into the intake port 37*b* from the first part 42*a*, a pressure loss is small and expander efficiency can be improved.

Although the embodiments of the present invention have been described above, the above embodiments are only an illustration of some application examples of the present invention and not intended to limit the technical scope of the present invention to the specific configurations of the above embodiments.

For example, although the case of the hybrid vehicle has been described in the above embodiments, there is no limitation to this. The present invention can be applied also to a vehicle mounted only with the engine 2. The engine 2 may be either a gasoline engine or a diesel engine.

This application claims a priority of Japanese Patent Application No. 2011-216738 filed with the Japan Patent Office on Sep. 30, 2011, all the contents of which are hereby incorporated by reference.

The invention claimed is:

1. An engine-waste-heat utilization device, comprising:
 a Rankine cycle with a heat exchanger that is configured to recover waste-heat of an engine to refrigerant, an expander that is configured to generate power using the refrigerant coming out from the heat exchanger, a condenser that is configured to condense the refrigerant coming out from the expander and a refrigerant pump that is configured to supply the refrigerant coming out from the condenser to the heat exchanger by being driven by the expander;
 a power transmission mechanism that is configured to transmit surplus power to the engine when the expander has spare power even if the refrigerant pump is driven;
 a clutch that is configured to connect and disconnecting power transmission by the power transmission mechanism; and
 a case provided near a high-temperature part of the engine such that a shaft of the expander and that of the refrigerant pump are coaxially arranged, the clutch, the refrigerant pump and the expander are integrally housed in this order and the expander has a higher temperature than the clutch.

2. The engine-waste-heat utilization device according to claim 1, wherein:
 the case is provided such that an intake port of the expander is close to the high-temperature part of the engine.

3. The engine-waste-heat utilization device according to claim 1, wherein:
 the engine is configured such that a plurality of cylinders are arranged in line and includes an exhaust manifold that is configured to collect and discharging exhaust gas of the plurality of cylinders;
 the shaft of the expander and that of the refrigerant pump are parallel to an output shaft of the engine; and
 the case is provided such that an expander side end part is close to the exhaust manifold.

4. The engine-waste-heat utilization device according to claim 1, wherein:
 the engine is configured such that a plurality of cylinders are arranged in line and includes an exhaust manifold that is configured to collect and discharging exhaust gas of the plurality of cylinders and a catalyst connected to a collection part of the exhaust manifold;
 the shaft of the expander and that of the refrigerant pump are parallel to an output shaft of the engine; and
 the case is provided such that an expander side end part is close to the catalyst.

5. The engine-waste-heat utilization device according to claim 1, wherein:
 the expander is a scroll type expander in which two scrolls composed of a fixed scroll and a movable scroll are engaged and the refrigerant flows from an intake port on a central side to a discharge port on a peripheral edge side; and
 a refrigerant passage in which the refrigerant coming out from the heat exchanger is supplied to the intake port of the expander includes a first part connected on a straight line with an axis of the intake port of the expander and a second part connected perpendicular to the first part.

6. The engine-waste-heat utilization device according to claim 1, wherein:
 the engine is so transversely mounted in a vehicle that an exhaust manifold is located on a vehicle front side and an intake manifold is located on a vehicle rear side; and
 the case is provided on a rear surface of the engine.

* * * * *